United States Patent
Gerlach

(10) Patent No.: US 6,847,914 B2
(45) Date of Patent: Jan. 25, 2005

(54) METHOD FOR DETERMINING THE ROTATIONAL POSITION OF THE DRIVE SHAFT OF A COMMUTATED DC MOTOR

(75) Inventor: Tobias Gerlach, Hagen (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 10/685,089

(22) Filed: Oct. 7, 2003

(65) Prior Publication Data

US 2004/0107071 A1 Jun. 3, 2004

Related U.S. Application Data

(63) Continuation of application No. PCT/EP02/05876, filed on May 29, 2002.

(30) Foreign Application Priority Data

May 30, 2001 (DE) .......................................... 101 26 169

(51) Int. Cl.$^7$ .......................... G01C 17/00; G01C 19/00
(52) U.S. Cl. ........................ 702/151; 318/254; 318/565; 702/78; 702/96; 702/145
(58) Field of Search ............................... 702/64–66, 96, 702/75, 76, 78, 84, 145, 151; 318/254, 183, 286, 466, 565, 608; 324/71.1, 160; 342/428; 388/809

(56) References Cited

U.S. PATENT DOCUMENTS 3,766,560 A * 10/1973 Bornhorst et al. .......... 342/428
4,639,648 A * 1/1987 Sakamoto ................... 318/254
4,881,174 A    11/1989 Gimmler
6,144,179 A    11/2000 Kessler et al.

FOREIGN PATENT DOCUMENTS

| DE | 37 21 827 A1 | 7/1987 |
| DE | 40 17 779 A1 | 6/1990 |
| DE | 42 17 265 A1 | 5/1992 |
| DE | 195 11 307 C1 | 3/1995 |
| DE | 197 29 238 C1 | 7/1997 |
| DE | 198 34 108 A1 | 7/1998 |

* cited by examiner

Primary Examiner—John Barlow
Assistant Examiner—John Le
(74) Attorney, Agent, or Firm—Brooks Kushman P.C.

(57) ABSTRACT

A method for determining the position of a shaft of a commutated direct current (DC) motor based on the current ripples contained in an armature current signal includes digitally sampling the armature current signal to generate signal values at sampling points. The signal value corresponding to a current sampling point and selected signal values corresponding to previous sampling points in a time interval containing the sampling points are compared. Either a rising or falling slope detection signal is generated if the comparison is indicative of either an increasing or decreasing tendency in the magnitudes of the signal values. The rising and falling slope detection signals are respectively indicative of rising and falling current ripple slopes. A current ripple signal is generated if rising and falling slope detection signals are generated one after the other in a given period. The shaft position is determined based on the current ripple signal count.

12 Claims, 3 Drawing Sheets

METHOD FOR DETERMINING THE ROTATIONAL POSITION OF THE DRIVE SHAFT OF A COMMUTATED DC MOTOR

CROSS-REFERENCE TO RELATED APPLICATIONS

This is a continuation of International Application PCT/EP02/05876, published in German, with an international filing date of May 29, 2002, which claims priority to DE 101 26 169.1 filed on May 30, 2001.

BACKGROUND OF THE INVENTION

1. Field of the Invention

The present invention relates to a method for determining the rotational position of the drive shaft of a commutated direct current (DC) motor by digitizing the armature current signal of the motor and then evaluating the digitized armature current signal.

2. Background Art

The armature current signal of a commutated DC motor includes a direct component and a ripple component superimposed on the direct component. The ripple component arises when the motor is operated as a consequence of the interaction of the magnet (field), the armature winding, and the commutator of the motor. This expresses itself in a transient change in the induced voltage which produces the ripple content in the armature current signal. The current peaks contained in the armature current signal—referred to below as current ripples—occur when the armature of the motor rotates.

The number of current ripples in a full revolution of the armature corresponds to the number of armature collector bars. For example, if the armature has ten collector bars then the armature current signal will have ten current ripples upon a full revolution of the armature. Thus, the number of counted current ripples is indicative of the actual rotational position of the motor's armature and drive shaft. Consequently, the counted current ripples is indicative of the position an element such as a motor vehicle window being driven by the motor along a predetermined travel segment.

In order to count the current ripples, the analog armature current signal is digitized. The number of current ripples counted in a certain time interval is the current ripple frequency. The current ripple frequency is indicative of the actual rotational speed of the motor.

To make it possible for current ripple detection to be performed with as few errors as possible, the analog armature current signal is conditioned before and possibly after digitization in order to suppress interference. Filtering is done to condition the armature current signal. The filtering may be in the form of low-pass filtering and/or frequency filtering.

For example, DE 195 11 307 C1 describes such a signal conditioning process. The purpose of such signal conditioning processes is to provide a precise armature current signal having minimal interference so that the current ripples contained in this conditioned armature current signal can be evaluated. To determine the position of the driven element, the current ripples in the conditioned armature current signal are counted. The counted result provides direct information regarding the actual rotational position of the drive shaft and the motor's armature. The current ripples contained in the armature current signal are usually counted using minima or maxima determination algorithms, or other algorithms to determine the zero crossings.

However, it can happen that the armature current signal contains missed and/or double current ripples which falsify the current ripple counter result. Missed current ripples are current ripples which are not detectable in the armature current signal even though a rotational movement of the motor's armature took place. Double current ripples are current ripples which appear in the armature current signal as double peaks of a single current ripple, so that if both maxima are counted during a maxima count, the current ripple counter result is mistakenly incremented by an extra count.

For appropriate correction of the current ripple counter result when missed and/or double current ripples occur it is common for the signal conditioning and evaluation processes to have a downstream correction process. The correction process is intended to identify the occurrence of missed and/or double current ripples so that it is then possible to make an appropriate correction in the current ripple counter result. The use of such a process is necessary because these errors are caused by the commutator or other superimposed interference, e.g., the ripple content in a vehicle electrical system, and thus they cannot easily be eliminated by conditioning the armature current signal.

DE 197 29 238 C1, for example, discloses such a correction process. In this process, at the time point when a current ripple is detected, the actual value of the rotational motor speed, as determined from the motor current and characteristic data, is used to calculate the point in time when the detection of the next current ripple is expected. This point in time is part of a tolerance band which has a fixed size. Thus, the process disclosed in this document involves enlarging the calculated probable time point of the next commutation (current ripple) by the size of the specified tolerance band. Accordingly, the absence of a current ripple at or before the calculated time point is only identified as a missed ripple if a current ripple also has not been detected within the tolerance band. However, this process is computationally intensive.

SUMMARY OF THE INVENTION

Therefore, starting from the prior art, the present invention provides a method for determining the rotational position of the drive shaft of a commutated direct current (DC) motor as a function of current ripples in the armature current signal in which the method detects current ripple slopes in order to detect the current ripples and any double current ripples in the armature current signal.

The method of the present invention includes continuously storing in a memory the actual, digitally sampled armature current values. When an actual value is stored in the memory, the value is compared with that of a certain number of previously stored values in the time sequence of their storage. A slope detection signal is generated if there is an overall rising or falling tendency of the examined values. The slope detection signal represents a rising or falling current ripple slope.

The method according to the present invention involves continuously storing the actual, digitally sampled armature current values in memory. The memory depth can be variable or fixed. In the latter case, it is expedient to use a shift register, for example a ring buffer memory having a number of memory locations. When an armature current value is stored in the ring buffer memory, this value is compared with that of a certain number of values previously stored in the ring buffer memory, for example all of them, in the sequence in which the values were stored. The comparison is performed to determine whether each value contained in the ring buffer memory is greater than or less than the value stored immediately before it, for example.

It is then possible, when each armature current value is stored, to make an overall determination about whether there is an overall rising or falling tendency over the previously stored values. If the method detects an overall rising or falling tendency, then the method generates a slope detection signal which reflects this tendency and represents a rising or falling current ripple slope.

In this discussion, when the terms "overall rising" and "overall falling" are applied to the tendency of the examined values, these terms refer to the tendency which the values reflect and do not necessarily have to be monotonic. Therefore, in the framework of this discussion a tendency is described as overall rising or overall falling if this tendency generally applies. However, when pairs of values are examined in detail they can also present other individual tendencies.

The method uses slope detection to detect a current ripple with it being possible to use the rising slope or the falling slope of each current ripple as a detection criterion. Given a sufficiently high digital sampling frequency, examining the slope instead of maxima, minima, or zero crossings, as is the case in the prior art, makes it possible for the detection time span to be much larger. Therefore, the determination of a current ripple does not depend on an individual value, as is the case in maxima/minima detection, but rather current ripple detection can take into consideration several digital sampling values. The examination depth of a certain number of previously determined values at a respective sampling time point makes it simple to identify and eliminate interference-based errors which would otherwise make themselves noticeable as a double current ripple, for example.

The method detects an error-free current ripple signal slope or slope section if an overall and monotonic tendency—rising or falling—over the values considered is present. Therefore, if such an overall monotonic tendency is present, the method generates a corresponding slope detection signal.

For the case in which the examined values present an overall uniform tendency, but it cannot be called monotonic due to anomalous values, in principle it is also possible to use these values for slope detection. Given such a result, a second usability test is done on the examined values. This second usability test can be done, for example, by subsampling the examined values and ignoring one or more values during the comparison. For example, when such a second usability test is done it is possible to consider only every second or third preceding value.

The second usability test can also be a type of statistical evaluation process in which the sizes of all values that are adjacent in time are compared to determine whether there is a positive or negative difference in size. Next, on the basis of the detected frequency of a positive or negative size difference between all temporally adjacent values that are examined it is possible to make a decision about whether the examined values have an overall rising or falling tendency. However, in this process it is expedient to provide a threshold value so that it is only concluded that there is a usable tendency if the frequency of one type of value is several times the frequency of the other type of value.

Using the current ripple slope extending over several sampling points for current ripple detection also makes it possible for a current ripple count to be done after several slope detection signals of the same kind have been generated. It is possible for such an evaluation to incorporate the previously described possibility of statistical evaluation.

To increase operational reliability, it is expedient if a slope detection signal, which in principle is used for a current ripple count, is only fed to the current ripple count if it has been confirmed by a plausibility check. For example, this plausibility check can be the detection of the next slope of the same type within a predetermined time interval. However, plausibility checking can also provide that a first slope detection signal, representing a current ripple slope, which can be rising or falling, must be confirmed by a second slope detection signal, representing the complementary slope of the current ripple, which accordingly must be falling or rising. Only then does the first slope detection signal enter into the current ripple count. The complementary slope detection signal ensures that the armature current signal actually has a maximum or minimum between these two slopes.

Because the slope detection is done over a certain time interval, this also ensures that double current ripples do not enter into the following evaluation. In addition, along with a plausibility check by the complementary slope detection signal, it is also possible to have this complementary slope detection signal subjected to additional control mechanisms, for example, a comparative time examination.

BRIEF DESCRIPTION OF THE DRAWINGS

The present invention is described below using a sample embodiment which refers to the following figures.

DETAILED DESCRIPTION OF THE PREFERRED EMBODIMENT(S)

Figure 1A:
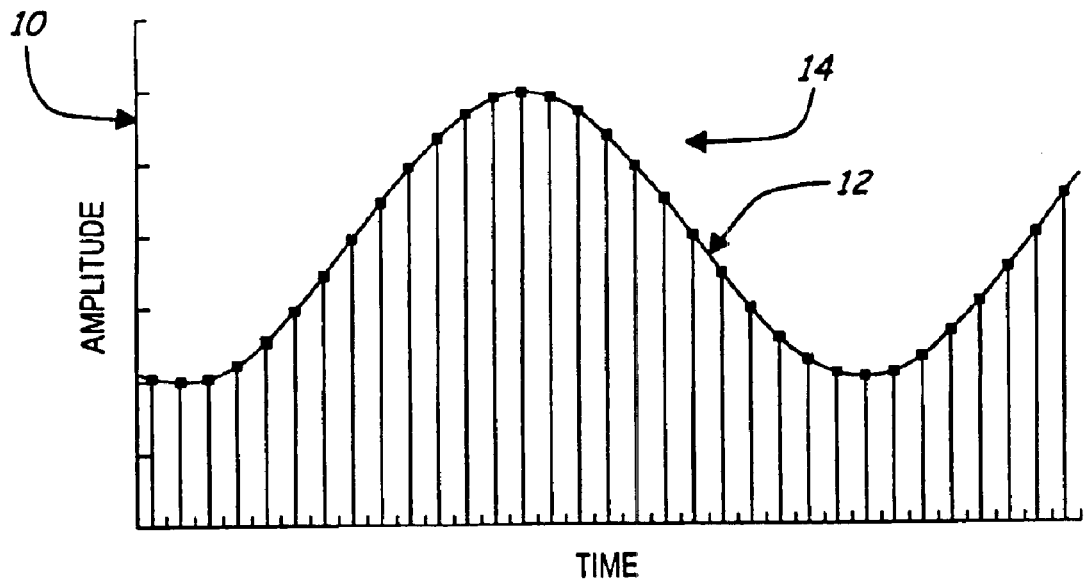
FIG. 1a illustrates a plot of the analog armature current signal of a commutated direct current (DC) motor and its digital sampling.

In plot 10 of FIG. 1a, the Y-axis represents armature current amplitude and the X-axis represents time. Plotted analog armature current signal 12 includes a current ripple 14. The analog armature current signal is digitally sampled and quantified according to a specified cycle. Next, the digital signal is low-pass filtered to eliminate high-frequency parasitic oscillations. The digital signal is then differentiated and low-pass filtered once again for smoothing. These signal conditioning steps are not shown, with the exception of the digital sampling of the analog armature current signal.

Figure 1B:
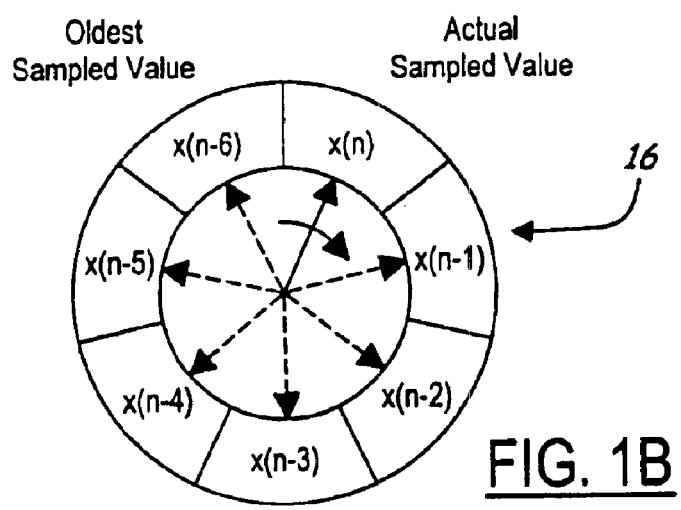
FIG. 1b illustrates the storage of sampled digital values of the armature current signal in a ring buffer memory.

To detect the current ripple contained in the analog armature current signal, the individual digitized and correspondingly conditioned values are stored in a ring buffer memory 16 as shown in FIG. 1b. Ring buffer memory 16 as shown in FIG. 1b has an exemplary set of seven memory locations. After the motor has started-up, ring buffer memory 16 is filled with the seventh sampling values taken at the first seventh sampling points. Each further sampling value is written into the memory location labeled with x(n) in exemplary ring buffer memory 16 while all preceding sampling values move from their current memory locations to the next oldest memory locations. As such, the value originally located in the last memory location x(n−6) is deleted.

When an actual sampling value is stored in memory location x(n), a size or value comparison is done with all preceding values x(n−1) . . . x(n−6) that are still located in ring buffer memory 16. The size comparison is done from one memory location to the next, and thus it is done with the older stored value to see whether the more recent value is greater than or less than the value that was stored at an earlier point in time. If, when a sampling value is stored in the memory location x(n), it is found that all older values are always becoming monotonically smaller, then a slope detection signal representing a rising slope of a current ripple is generated. In principle, this generated slope detection signal can be used for a current ripple count.

However, this slope detection signal only actually enters into the current ripple count once it has been confirmed by a complementary slope detection signal. The slope detection signal that is complementary to the previously described rising one is a falling one. In this event, the actual sampling value stored in ring buffer memory 16 in memory location x(n) will be the smallest value stored in the ring buffer memory, and all older values will be monotonically rising and larger. This points to the current ripple having a falling slope at the time point when memory location x(n) is occupied. This measure of mutual interlocking of complementary slope identification signals ensures that a slope identification signal only enters into the current ripple count if a current ripple has actually been detected. In the sample embodiment shown, only the rising slope identification signal confirmed by the falling slope identification signal enters into the current ripple count.

Figure 2A:
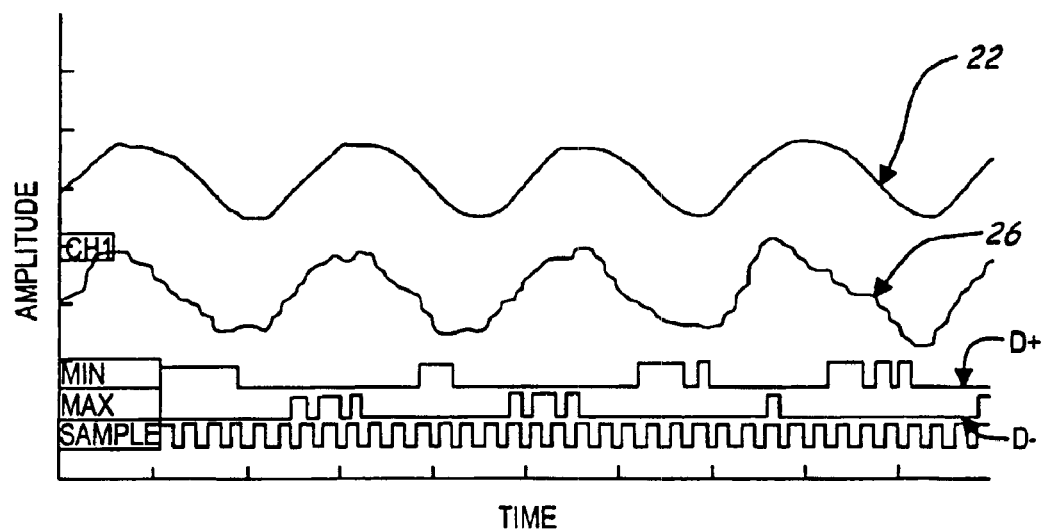
FIGS. 2a and 2b illustrate plots of the analog armature current signal of the motor and the digital signal curves (D+, D−) derived from the armature current signal for current ripple slope detection.
Figure 2B:
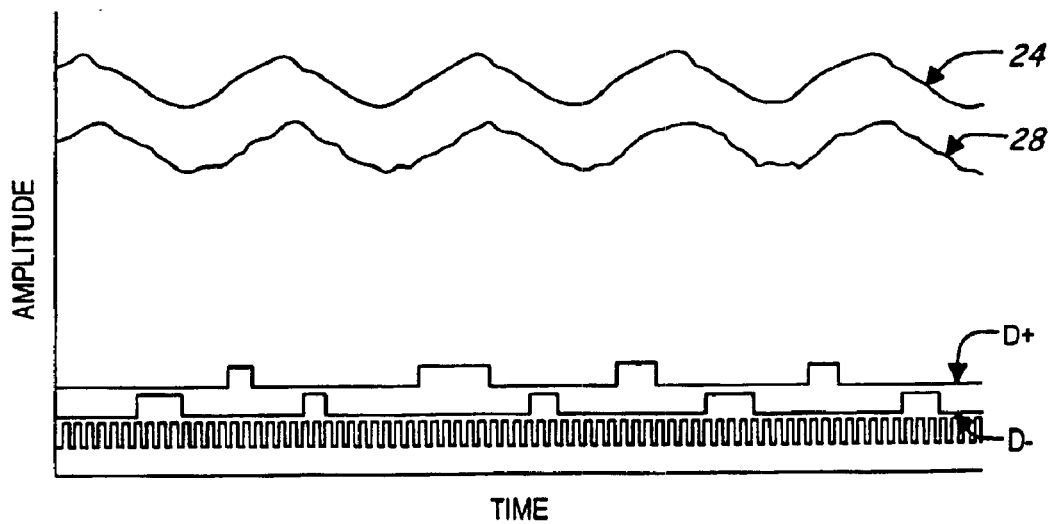

For clarity, FIGS. 2a and 2b once again show the mutual interlocking of complementary slope identification signals during the course of the armature current signal of a commutated DC motor. The top signals 22 and 24 in each of FIGS. 2a and 2b represents the analog armature current signal. Digitized armature current signals 26 and 28 are shown below the analog armature current signals 22 and 24. In digitized armature current signals 26 and 28 the individual digital values are connected together. The digitized sampling values are then low-pass filtered, differentiated, and low-pass filtered once again.

The digital sampling frequency signals 30 and 32 are shown at the bottom of each of FIGS. 2a and 2b. The signals marked D− in FIGS. 2a and 2b include the time points at which rising slopes have been detected from the conditioned armature current signal. The signals marked D+ which reproduce the rising current ripple slopes that have been detected include the time points at which falling current ripple slopes have been detected. The signals D+, which show when rising slopes are detected, and the signals D−, which show when falling slopes are detected, are plotted independent of one another without a first slope identification signal being confirmed by another complementary one.

The illustration in FIG. 2a makes it possible to see that due to the shape of the digitized armature current signal some slopes have been detected as rising or falling several times. This may occur because the armature current signal has an irregular shape or because the length of the slopes is so great that the slope detection has taken place several times over the duration of a current ripple slope. Some of the individual current ripples of the digitized armature current signal show a double peak with two maxima so that in principle there are several rising slopes to be detected.

FIG. 2b shows corresponding signals, in which, however the rising and falling slope detection signals are mutually interlocked with one another, so that, for example, only one such rising slope identification signal is considered valid. This is then confirmed by a complementary slope identification signal (in this case a falling one). Therefore, the only rising slope detection signals which enter into the current ripple count are those that are immediately followed by a falling slope identification signal. The other rising slope detection signals are disregarded because no falling slope detection signal has been found following them in time. Thus, during this evaluation double ripples or high-frequency interference is eliminated without difficulty.

Figure 3:
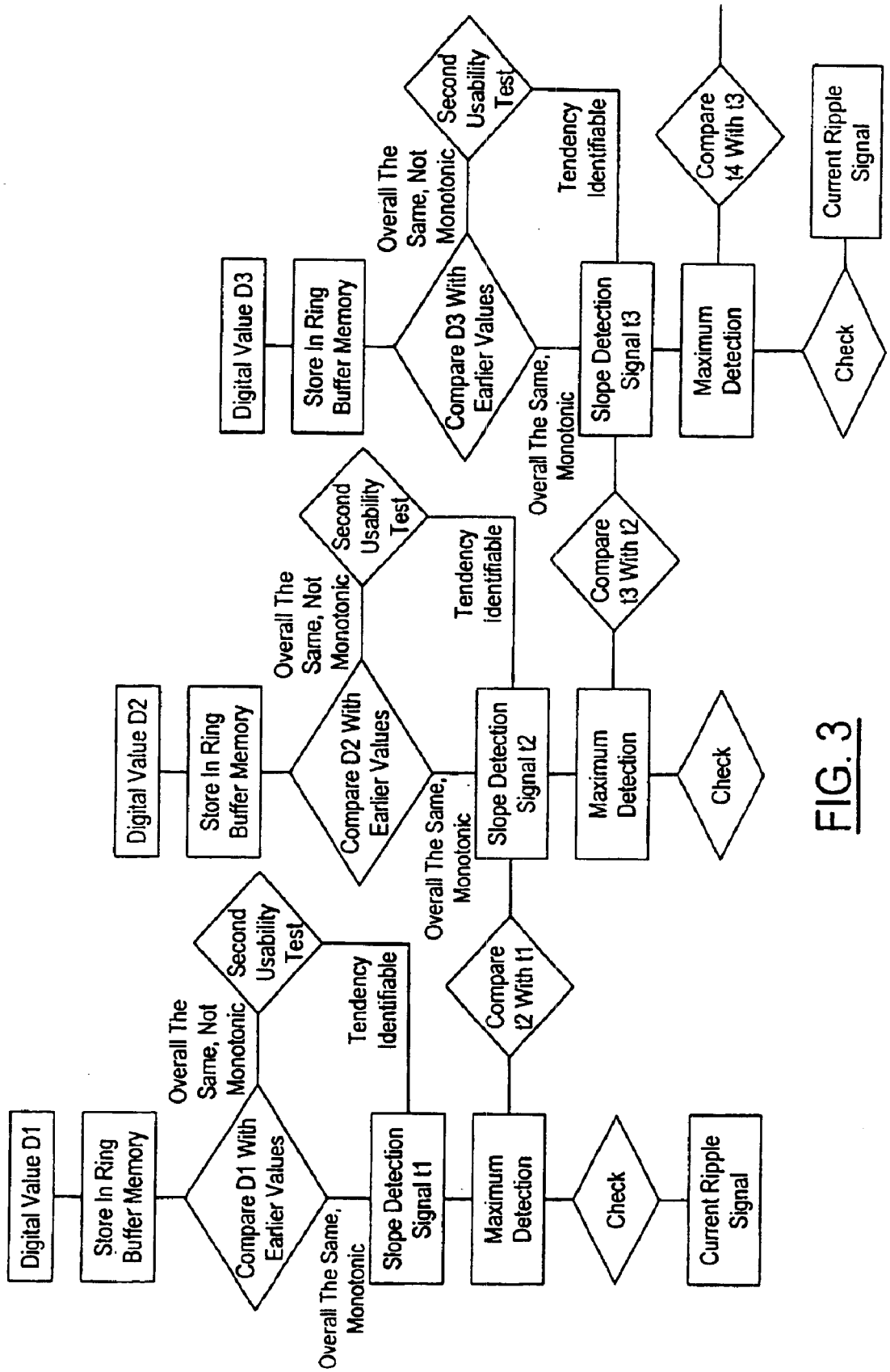
FIG. 3 is a flowchart illustrating the steps used by the method of the present invention for detecting current ripples from current ripple slopes.

FIG. 3 illustrates a flow chart in which the described operational steps of the method of the present invention are reproduced. To elaborate on the slope detection described with respect to FIGS. 1a and 1b, which ultimately led to the generation of a first slope detection signal as all the values stored in the ring buffer memory were rising, overall and monotonically, from the first stored value to the last stored value. A slope detection signal is not generated if one of the seven values stored in the ring buffer memory did not meet this criterion. However, because such anomalous values can occur due to interference, in principle it is also possible to generate a slope detection signal using such overall rising or overall falling value sequences which have a small number of such anomalous values, without falsifying the result.

For this purpose, if it is found that the criterion of an overall and monotonically rising or falling value sequence is not met, these values can be subjected to a second usability test. In the sample embodiment shown, this second usability test involves performing a subsampling, in which only every other value stored in ring buffer memory 16, starting from the last stored value x(n), is examined according to the previously described criterion. If it is found that these values that are then examined meet the criterion of overall and monotonically rising or falling, then a slope detection signal is generated on this basis.

If an appropriate series of values is not present in ring buffer memory 16, no slope is detected, and accordingly in this case neither is any slope detection signal generated. This is especially the case in the area of the maxima and minima of the armature current signal.

Before the first slope detection signal enters into the current ripple count, it is locked and compared with the tendency of the next slope detection signal generated after a slope detection. If the tendency of the next generated slope detection signal is the same as the tendency of the locked one, then the first slope detection signal does not enter into the current ripple count and is not processed any further. Instead, the following slope detection signal is then locked. Only once a locked slope detection signal with a certain tendency has been confirmed by a following slope detection signal with a complementary tendency can it be concluded from it that a maximum or a minimum of the armature current signal, namely a current ripple, has been detected. Then one of the two slope detection signals enters into the current ripple count, or a separate current ripple signal is generated.

Before a current ripple count signal is generated after detection of a maximum or minimum in the armature current signal, it is possible to use a process to recheck the plausibility of the maximum that is now detected on the basis of the theoretical possibility of the presence of a current ripple. For example, this can be time examinations, which, for example, use the time of the last detected current ripple and knowledge of the speed of the motor (as determined from the motor current and characteristic data, for example) to determine when the next commutation process (i.e., next current ripple) is expected.

The description of the method of the present invention makes it clear that the time depth taken into account when there is slope detection makes it simple to eliminate transient interference. The object of the method of the present invention also makes it simple to avoid misinterpretation of double current ripples.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method for determining the rotational position of a drive shaft of a commutated direct current (DC) motor as a function of the number of current ripples contained in an armature current signal of the motor as the motor drives the drive shaft, the method comprising:

digitally sampling at sampling time points the armature current signal of the motor as the motor drives a drive shaft;

generating a digitally sampled armature current signal value at each sampling time point;

storing each digitally sampled armature current signal value in memory as the digitally sampled armature current signal values are generated;

comparing the magnitude of the digitally sampled armature current signal value corresponding to a current sampling time point and the magnitudes of selected ones of the digitally sampled armature current signal values corresponding to previous sampling time points in a time interval containing the current and previous sampling time points;

generating a rising slope detection signal if the comparison is indicative of an increasing tendency in the magnitudes of the digitally sampled armature current signal values over the time interval, the rising slope detection signal being indicative of a rising current ripple slope; and generating a falling slope detection signal if the comparison is indicative of a decreasing tendency in the magnitudes of the digitally sampled armature current signal values over the time interval, the falling slope detection signal being indicative of a falling current ripple slope.

2. The method of claim 1 wherein:

a rising slope detection signal is generated if the magnitudes of the compared digitally sampled armature current signal values monotonically increase over the time interval; and a falling slope detection signal is generated if the magnitudes of the compared digitally sampled armature current signal values monotonically decrease over the time interval.

3. The method of claim 1 wherein:

the step of comparing includes conducting a second usability test of the magnitudes of the compared digitally sampled armature current signal values if the compared magnitudes have a non-monotonic tendency.

4. The method of claim 3 wherein:

conducting the second usability test includes disregarding at least one of the digitally sampled armature current signal values corresponding to the previous sampling time points from the comparison.

5. The method of claim 3 wherein:

conducting the second usability test includes statistically evaluating the digitally sampled armature current signal values at the current and previous sampling time points to determine whether the magnitudes of adjacently sampled armature current signal values have either an increasing or decreasing tendency, and determining whether the compared digitally sampled armature current signal values have an overall non-uniform monotonic tendency based on the frequency of determined increasing and decreasing tendencies.

6. The method of claim 1 further comprising:

examining each preceding generated slope detection signal within a given time period to determine its tendency; and determining whether there is an overall rising or falling tendency within the given time period based on the frequency of the tendencies determined from the examination.

7. The method of claim 1 further comprising:

varying the time interval as a function of the operating state of the motor.

8. The method of claim 1 further comprising:

subjecting a generated slope detection signal to a plausibility check.

9. The method of claim 1 further comprising:

generating a current ripple signal if rising and falling slope detection signals are generated one after the other in a given time period.

10. The method of claim 9 further comprising:

counting the generated current ripple signals; and determining the rotational position of the drive shaft based on the counted amount of current ripple signals.

11. The method of claim 9 further comprising:

generating a double current ripple signal if a second pair of rising and falling slope detection signals are generated one after the other in the given time period, the double current ripple signal being indicative of a double current ripple.

12. The method of claim 11 further comprising:

counting the generated current ripple signals and counting the generated double current ripple signals;

subtracting the count of double current ripple signals from the count of current ripple signals to determine a corrected current ripple signal count; and determining the rotational position of the drive shaft based on the corrected current ripple signal count.

* * * * *